April 27, 1954  R. D. PERRY ET AL  2,676,572
FLUID PRESSURE TOOL SLIDE CONTROL ASSEMBLY
Original Filed Aug. 10, 1949  2 Sheets-Sheet 1

INVENTORS.
RICHARD D. PERRY
& ROSS H. BAUMGARDNER
BY
RICHEY, WATTS, EDGERTON & McNENNY
ATTORNEYS.

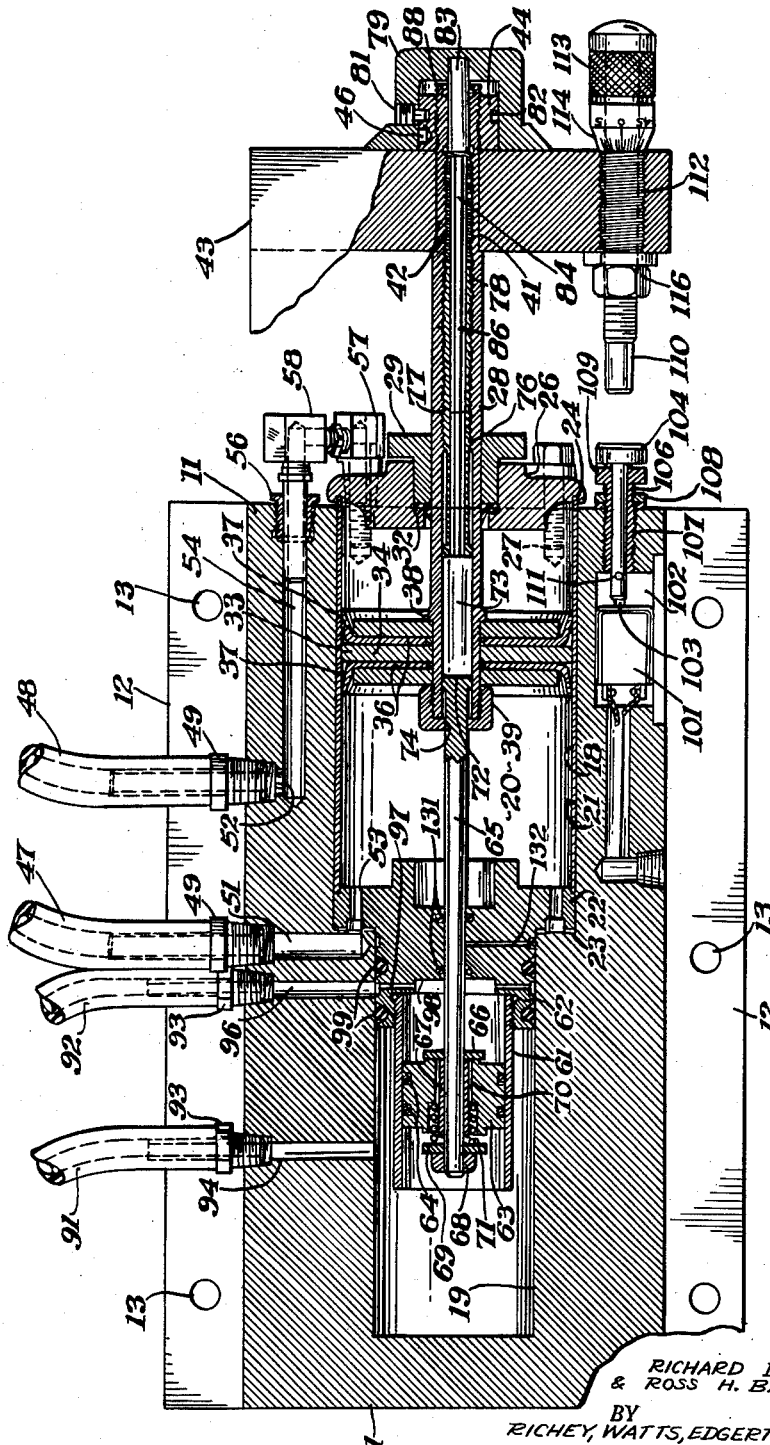

Patented Apr. 27, 1954

2,676,572

UNITED STATES PATENT OFFICE 2,676,572

FLUID PRESSURE TOOL SLIDE CONTROL ASSEMBLY

Richard D. Perry and Ross H. Baumgardner, Elyria, Ohio, assignors to The Perry-Fay Company, Elyria, Ohio, a corporation of Ohio Original application August 10, 1949, Serial No. 109,447, now Patent No. 2,605,751, dated August 5, 1952. Divided and this application June 19, 1952, Serial No. 294,508

3 Claims. (Cl. 121—45)

Our invention relates to feed apparatus for machine tools and, particularly, to pneumatic feeding devices of the character disclosed in our copending application entitled "Automatic Screw Machine," Serial No. 34,714, filed June 23, 1948, now Patent No. 2,627,646. This application is a division of our copending application entitled "Fluid Pressure Tool Slide Control Assembly," Serial No. 109,447, filed August 10, 1949, now Patent No. 2,605,751.

In its preferred embodiment, the present invention comprises a feeding system for the tool slides or turrets of automatic screw machines and the like. The system employs a pneumatic cylinder for advance and retraction of the tool slide in combination with a hydraulic check to regulate the rate of advance during the cutting or turning operation. The tool is fed rapidly by the pneumatic cylinder from its rest position substantially into engagement with the work and is then fed slowly at a rate determined by the setting of a throttling valve which forms a part of the hydraudlic speed control. Upon the completion of the feed to a pre-set point, the pneumatic cylinder is reversed to retract the tool at high speed. The point in the stroke at which the hydraulic speed regulator becomes operative is adjustable, as well as the end point of the cutting stroke.

The invention disclosed herein differs from the aforesaid prior application principally in two ways. One is that the pneumatic and hydraulic cylinders are built into the framework of the machine beneath the tool slide, this resulting in a more compact and cleaner arrangement. The second is that the reversing control for the pneumatic cylinder and the positive stop which accurately determines the limit of movement of the tool slide have been combined. This is highly advantageous in simplifying the adjustment and setup of the machine. It is also important in improving the performance of the machine, since, with the previous construction in which the positive stop and the reverse control were separate, the two controls sometimes fell out of synchronism as the machine warmed up. The result of this deviation could be either failure of the tool slide to reach the positive stop or failure to reverse and withdraw upon reaching the positive stop.

It will be seen from the foregoing, and more fully from the detailed description herein, that the present invention represents a substantial improvement of the invention disclosed in the aforesaid application.

Referring to the drawings:

Fig. 1 is a plan view, principally in horizontal section, of a tool slide assembly in accordance with the invention;

Figure 2:
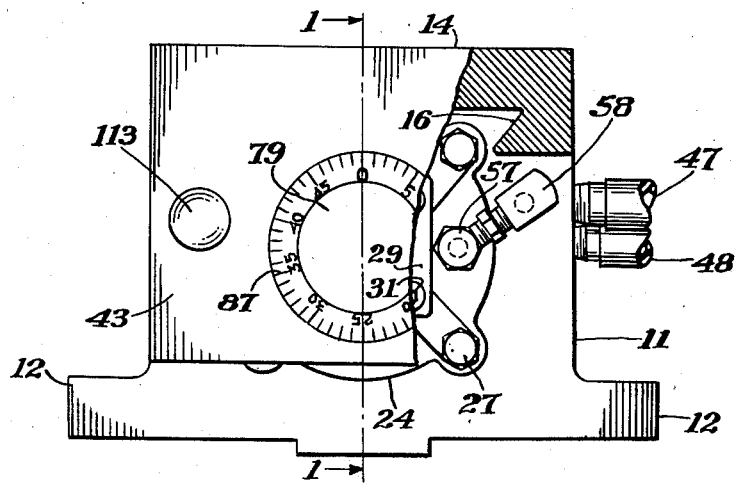
Fig. 2 is an elevation view of the same, partly cut away.

The invention is disclosed herein as a tool slide assembly per se, inasmuch as the application of such slides to turning machines such as automatic screw machines is readily understood, and the illustration of parts of the machine other than the tool slide is not necessary to an understanding of the invention.

The invention is incorporated in a cylinder block 11 formed with flanges 12 drilled as at 13 so that the assembly may be bolted to the bed or other fixed structure of the machine. The tool slide 14, which may carry a cutting tool, a stop for the work, or other instrumentality, is reciprocable over the upper surface of the block 11 and is formed with a mortised undersurface 16 for engagement with tenons on the upper surface of the block 11 of the usual dovetail form. The block is bored to form an outer cylindrical chamber 18 and an inner cylindrical chamber 19 in alignment therewith. The bore 18 forms a housing for a pneumatic cylinder 20 with a sliding fit therein, which comprises a cylinder wall 21 and a cylinder head 22 which may be brazed to the wall. The cylinder head abuts the shoulder 23 between the portions 18 and 19 of the bore and extends into the portion 19. The outer cylinder head 24 is formed with an annular groove 26 to receive the outer end of the cylinder wall and is retained in place by cap screws 27 received in tapped holes in the block.

The cylinder head 24 is formed with a central aperture for a tubular piston rod 28 and a stuffing box assembly comprising a gland 29, retained by cap screws 31 entering the head, and packing 32.

The piston rod 28 couples the tool slide 14 to a piston 33 which may consist of a central disk 34 and outer disks 36 retaining cup packings 37 of leather or the like. The piston is retained in assembled relation against a shoulder 38 on the rod by the nut 39 tightened on the threaded inner end of the piston rod. The outer end of the piston rod is formed with a portion 41 of reduced diameter received in a bore 42 in a depending portion 43 of the tool slide, the rod having a shoulder abutting against the portion 43. The piston rod is threaded at its outer end to receive a nut 44 which clamps the portion 43 of the slide against the shoulder of the piston rod, the nut being formed with sockets 46 for a spanner wrench or the like. The piston is thus retained in fixed relation to the tool slide and the tool slide is moved for tool feed by the piston 33.

The preferred arrangement for supplying air to the cylinder 20 includes flexible hoses 47 and 48 fitted with hose ends of any suitable type indicated generally as 49 which are fitted into tapped inlet openings 51 and 52, respectively, in the body. The radial bore 51 is in communication with a longitudinal bore 53 in the cylinder head 22 and in the block 11 so that fluid may be introduced through it to the inner end of the cylinder 20. The bore 52 intersects a longitudinal bore 54 in the block, the outer end of which is tapped to receive a fitting 56. The cylinder head 24 is tapped for a right-angle fitting 47 which is coupled through a second right-angle fitting 58 and the union 56 to the bore 54 in the block 11. It will be apparent, of course, that the hose 48 could, if desired, be connected directly into the cylinder head; but the arrangement described is preferred since it disposes the hose 48 adjacent the hose 47 and remote from the outer end of the cylinder. The connection between the bore 54 and the cylinder head may be readily removed if desired for access to the cylinder.

The motion of the piston 33 and tool slide 14 is checked and controlled during the working part of the stroke by a hydraulic system including a piston and cylinder mounted in the chamber 19. This arrangement comprises a cylinder shell 61 threaded into a recess in the face of the cylinder head 22, leakage being prevented by an O-ring seal 62. A piston 63 is reciprocable in the cylinder 61 and is fitted with sealing rings 64. This piston is coupled by a lost-motion connection to a piston rod 65 which is coupled to the piston rod 28. The piston rod 65 includes an end portion of reduced diameter at the inner end of which is fitted a washer 66 against which the piston 63 abuts. The piston is slidable upon a sleeve 67 pressed on the outer end of the piston rod and abutting the washer 66. The piston is retained by a nut 68 and washer 69 and a compression spring 71 received in a recess in the face of the piston.

The sleeve 67 is provided with splines, as indicated at 70, so that fluid may pass through the central bore of the piston. Under the action of the spring 71, the piston 63 and washer 66 act as a check valve. When the valve seats, the forward face of the piston engages the washer 66 so that the flow of fluid from the left-hand end of the cylinder 19 to the right-hand end in Fig. 1 is prevented; however, when the rod 65 is drawn outwardly in the return stroke of the slide, the rod 65 moves relatively to the piston 63 and flow through the splines 70 takes place so that a rapid return movement of the slide is effected. The passages in the interior of the piston may be sufficiently small to oppose fluid flow sufficiently to damp the return movement of the slide and prevent excessive speed of the return movement.

Figure 3:
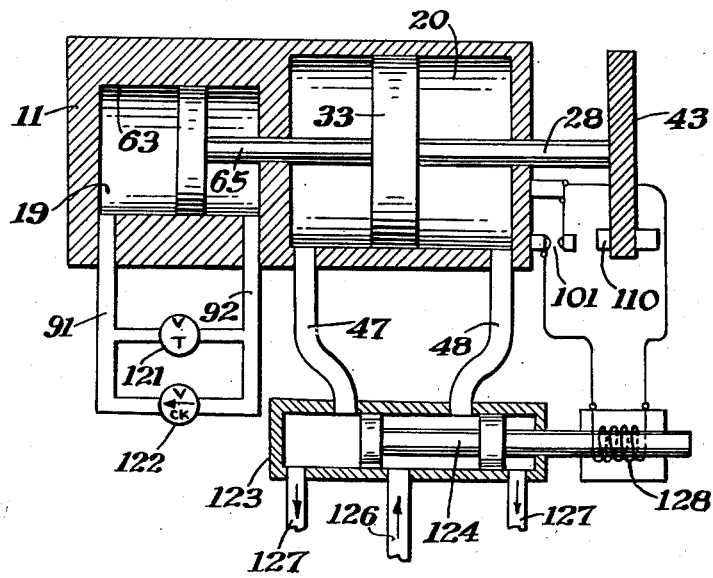
Fig. 3 is a schematic diagram of the pneumatic, hydraulic, and electric circuits.

It will be apparent that, as an alternative to the check valve arrangement in the cylinder, an external check valve could be used, as illustrated in Fig. 3; however, greater precision is attained by the preferred construction shown in Fig. 1.

The outer end of the piston rod 65 is formed with a head 72 which is slidable in a longitudinal bore 73 of the tubular piston rod 28. The nut 39 is formed with a bore 74 which is large enough for sliding movement of the rod 65 therein, but small enough so that the nut will engage the flange 72 of the piston rod. Therefore, when the piston 33 moves to the right, the piston 63 is drawn with it when the nut 39 engages the flange 72. When the piston 33 moves inwardly, the rod 65 and piston 63 are not affected until the end of the rod 65 is engaged by plunger 76 movable axially within the rod 28. The rod 76 is formed with a threaded portion 77 which is fitted in a threaded portion 78 of the rod. The plunger 76 is adjusted longitudinally of the rod 28 by rotating it relatively to the rod, which is accomplished by a knob 79 rotatably mounted on the periphery of the nut 44, being secured thereon by a set screw 81 received in an annular groove 82 of the nut. The knob 79 is pressed or otherwise nonrotatably mounted on a shaft 83 extending into the piston rod 28 and formed with a hexagonal or other noncircular portion 84 received in a mating noncircular opening in the plunger 76. Thus, rotation of the dial 77 advances and retracts the plunger 76 with respect to the rod 28 and likewise with respect to the tool slide 14. The dial 79 may be provided with appropriate micrometric graduation 87 if desired. A seal 88 may be fitted in an annular groove in the outer end of the shaft 28 to prevent leakage of air from the internal passage in the piston rod.

As will be apparent, if the piston 33 moves inwardly, it may do so without any resistance except from friction until the plunger 76 engages the head 72 of the check device, at which time the piston 63 of the check device is carried along with the piston 33. The movement of the piston 63 is utilized to force hydraulic fluid through a suitable adjustable orifice to determine the speed of the cutting operation. The connections for the hydraulic fluid include flexible hoses 91 and 92 fitted by appropriate hose end devices into radial bores 94 and 96 in the block 11. The bore 94 enters the side of the chamber 19 and is thus in direct communication with the inner face of the piston 63. The bore 96 is in communication with a radial bore 97 in the cylinder head 22 which communicates with the inner face of the piston 63 by way of a recess 98 in the head. O-ring seals 99 fitted in the grooves in the head on either side of the bores 96, 97 prevent leakage of fluid between the head and the wall of the chamber 19. The head 22 is fitted with O-rings 131 for the rod 65 and a vent passage 132.

The cutting movement of the tool can be terminated by the action of a valve which reverses the movement of the air piston 33. However, for precise work it is necessary that a more definite termination of the stroke be assured. This is accomplished by a positive stop for the tool slide which is engaged substantially synchronously with the reversal of the piston. In other words, substantially at the end of the desired travel of the slide, the direction of supply of air in the cylinder is reversed; but before this action can take effect, air pressure in the outer end of the cylinder forces the tool slide against a positive stop, thus definitely fixing the extent of travel of the slide. The preferred structure for this purpose comprises a sensitive switch 101 mounted in a recess 102 in the body in any convenient manner, as by the customary expedient of screws passing through the body of the switch. The switch 101 is of a type, well known commercially, in which the action of the switch is effected by a very small movement of a reciprocating plunger which extends from the body of the switch and in the switch operates with an over-center or snap action. Such switches are available in which the operating travel of the plunger is very small and the switch will operate when the plunger is depressed to a certain extent, with very slight variation in the operating point. The plunger 103 of the switch is engaged by a plunger 104 slidably mounted in a sleeve 106 which is threaded into a longitudinal bore in the front wall of the chamber 102. The sleeve 106 is provided with a hexagonal head 107 by which it may be adjusted longitudinally of the block 11 and is fitted with a jam nut 108. The bore in which the plunger 104 is slidable is provided with an annular enlargement at its outer end for an O-ring or other resilient ring 109 which bears against the head of the plunger to maintain the same slightly clear of the head 107 of the sleeve. The plunger is retained in the sleeve by a transverse pin or cotter key 111. The sleeve 106 is so adjusted with respect to the switch 101 that the switch is operated during the movement of the plunger from its illustrated position into engagement with the head 107 of the sleeve, and just before this engagement takes place. The plunger 104 is engaged by a spindle 110 threaded in a sleeve 112 in the portion 43 of the tool slide. The spindle 110 is provided with a thimble 113 with micrometric graduations 114 to facilitate adjustment. A jam nut 116 is fitted on the threaded portion of the spindle so that it may be locked in position after the setup has been completed.

After the tool is set up in any suitable manner on the tool slide to give the approximate desired depth of cut, the spindle 110 is adjusted so that the exact depth of cut desired is obtained when the spindle 110 forces the head of the plunger 104 against the sleeve 106. The knob 79 is then adjusted to bring the hydraulic check device into action just before the tool engages the work, and the cutting speed is set by adjustment of the check device.

It is believed that the nature of a suitable pneumatic, hydraulic, and electric system will be apparent to those skilled in the art from the foregoing, and reference may be made to our above-mentioned Patent No. 2,627,646. However, an elementary schematic diagram of the system is included for those who may desire the same. By reference to this diagram, in which the physical assembly is greatly simplified and parts are given numbers corresponding to those in the detail drawings, the cylinders 19 and 20 in the block 11 and the pistons 33 and 63 therein, the piston rod 28 coupled to the portion 43 of the tool slide, and the rod 65 of the hydraulic piston will be apparent. The hydraulic cylinder is coupled through the lines 91 and 92 to a throttle valve 121 and a valve 122 in parallel, the check valve permitting free flow of fluid from the outer end of the cylinder 19 to the inner end so that the piston 63 may move freely to the right in the diagram. The showing of the check valve outside the cylinder may be regarded as a schematic illustration of the construction shown in detail in Fig. 1, in which the check valve is physically within the cylinder 19. It may be also regarded as illustrating an alternative form of construction. When the piston is moved to the left in the diagram, the check valve prevents flow therethrough and directs the fluid through the throttling valve which may be adjusted to regulate cutting speed. The air cylinder 20 is fed through the lines 47 and 48 from a valve illustrated schematically in the figure as a slide valve 123 of conventional type. Reciprocation of the valve plunger 124 directs air from an inlet line 126 into either of the lines 47 or 48 and exhausts air from the other cylinder line to atmosphere through one of the outlets 127. The valve plunger 124 may be shifted in any desired manner, as by means disclosed in our Patent No. 2,627,646, to supply air to the outer face of the piston 33 to move the tool into the work. As illustrated in the schematic, the valve is shifted to withdraw the tool slide by a solenoid 128 energized by the switch 101 (illustrated schematically herein) which is closed by the actuator 110. The details of these devices in the electric, pneumatic, and hydraulic circuits are immaterial to an understanding of the invention.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or spirit of the invention as herein claimed.

What is claimed is:

1. A feed control mechanism for lathe slides comprising a reversible hydraulic motor for advancing and retracting the slide, said motor having a piston and rod assembly affixed to the slide, said rod being hollow and threaded internally at one end thereof, a dash pot for regulating the rate of the advance of the slide, said dash pot having a rod extending into the hollow portion of the piston rod, a sleeve internal of said piston rod and threadably engaged with the threaded portion of said piston rod, the end of said sleeve engaging said dash pot rod as said slide moves toward the work, and dial means manually controllable external of said slide for positioning said sleeve relative to the slide to determine the point in the advance of the slide at which the dash pot regulates the speed of travel.

2. A feed control mechanism for lathe slides comprising a reversible hydraulic motor for advancing and retracting the slide, said motor having a piston and rod assembly affixed to the slide, said rod being hollow and threaded internally at one end thereof, a dash pot coaxial with said motor for regulating the rate of the advance of the slide, said dash pot having a rod extending into the hollow portion of the piston rod, a sleeve internal of said piston rod and threadably engaged with the threaded portion of said piston rod, the end of said sleeve engaging said dash pot rod as said slide moves toward the work, and dial means manually controllable external of said slide for positioning said sleeve relative to the slide to determine the point in the advance of the slide at which the dash pot regulates the speed of travel.

3. A feed control mechanism for lathe slides comprising a reversible hydraulic motor for advancing and retracting the slide, said motor having a piston and rod assembly affixed to the slide, said rod being hollow and threaded internally at one end thereof, a dash pot coaxial with said motor for regulating the rate of the advance of the slide, said dash pot having a rod extending into the hollow portion of the piston rod, a sleeve internal of said piston rod and threadably engaged with the threaded portion of said piston rod, the end of said sleeve engaging said dash pot rod as said slide moves toward the work, a splined shaft in engagement with said sleeve, and a dial on said shaft external of said slide for rotating and positioning said sleeve to determine the point in the advance of the slide at which the dash pot regulates the speed of travel.

References Cited in the file of this patent

UNITED STATES PATENTS

| Number | Name | Date |
|---|---|---|
| 1,998,873 | Kingsbury | Apr. 23, 1935 |
| 2,563,918 | Casella et al. | Aug. 14, 1951 |
| 2,624,319 | Heyer | Jan. 6, 1953 |